US010981258B2

(12) United States Patent
McLain et al.

(10) Patent No.: US 10,981,258 B2
(45) Date of Patent: *Apr. 20, 2021

(54) ADJUSTABLE STROKE MECHANISM FOR RANDOM ORBITAL MACHINE

(71) Applicant: Lake Country Manufacturing, Inc., Oconomowoc, WI (US)

(72) Inventors: Scott S. McLain, Mukwonago, WI (US); Mark Snyker, Apple Valley, WI (US)

(73) Assignee: Lake Country Tool, LLC, Oconomowoc, WI (US)

( * ) Notice: Subject to any disclaimer, the term of this patent is extended or adjusted under 35 U.S.C. 154(b) by 345 days.

This patent is subject to a terminal disclaimer.

(21) Appl. No.: 16/057,002

(22) Filed: Aug. 7, 2018

(65) Prior Publication Data

US 2018/0339396 A1 Nov. 29, 2018

Related U.S. Application Data

(63) Continuation of application No. 15/678,553, filed on Aug. 16, 2017, now Pat. No. 10,518,384, which is a (Continued)

(51) Int. Cl.
*B24B 47/12* (2006.01)
*B24B 23/02* (2006.01)
(Continued)

(52) U.S. Cl.
CPC ............. *B24B 47/12* (2013.01); *B24B 23/02* (2013.01); *B24B 23/04* (2013.01); *F16C 3/28* (2013.01);
(Continued)

(58) Field of Classification Search
CPC ......... B24B 23/02; B24B 23/04; B24B 47/10; F16C 19/06; F16C 19/08; F16C 19/54; F16C 2322/50
(Continued)

(56) References Cited

U.S. PATENT DOCUMENTS

| 169,753 A | 11/1875 | White |
| 3,898,887 A | 8/1975 | Grant |

(Continued)

FOREIGN PATENT DOCUMENTS

| EP | 0 157 532 | 10/1985 |
| EP | 0 820 838 | 1/1998 |

(Continued)

*Primary Examiner* — George B Nguyen
(74) *Attorney, Agent, or Firm* — Harness, Dickey & Pierce, P.L.C.

(57) ABSTRACT

An adjustable stroke mechanism for a random orbital machine including a housing having a wall enclosing a cavity, an adjuster ring surrounding the housing and having a first set of gear teeth along a first portion of an inner surface, and a second set of gear teeth along a second portion of the inner surface, a counterweight having gear teeth on an exterior surface disposed within the housing, and a bearing carriage having gear teeth disposed within the housing. At least one counterweight gear that meshes with the gear teeth of the counterweight and the first set of gear teeth of the adjuster ring, and at least one bearing carriage gear that meshes with the gear teeth of the bearing carriage and the second set of gear teeth of the adjuster ring, so that movement of the adjuster ring causes movement of both the counterweight and the bearing carriage.

9 Claims, 17 Drawing Sheets

Related U.S. Application Data continuation-in-part of application No. 15/339,317, filed on Oct. 31, 2016, now Pat. No. 10,144,106.

(60) Provisional application No. 62/340,335, filed on May 23, 2016, provisional application No. 62/249,521, filed on Nov. 2, 2015.

(51) Int. Cl.
  *B24B 23/04* (2006.01)
  *F16C 3/28* (2006.01)
  *F16C 19/54* (2006.01)
  *F16C 19/08* (2006.01)
  *F16C 19/06* (2006.01)

(52) U.S. Cl.
  CPC ............. *F16C 19/06* (2013.01); *F16C 19/08* (2013.01); *F16C 19/54* (2013.01); *F16C 2322/50* (2013.01)

(58) Field of Classification Search
  USPC ........................................................ 451/357
  See application file for complete search history.

(56) References Cited

U.S. PATENT DOCUMENTS

| | | |
|---|---|---|
| 4,328,718 A | 5/1982 | Robinson et al. |
| 4,610,111 A | 9/1986 | Cox |
| 5,020,281 A | 6/1991 | Neff |
| 5,134,777 A | 8/1992 | Meyer et al. |
| 5,879,228 A | 3/1999 | Sun |
| 5,904,027 A | 5/1999 | Bonde |
| 5,947,804 A | 9/1999 | Fukinuki et al. |
| 6,062,960 A | 5/2000 | Kai et al. |
| 6,089,065 A | 7/2000 | Deriaz |
| 6,206,771 B1 | 3/2001 | Lehman |
| 6,796,203 B2 | 9/2004 | Dubrowskij |
| 7,238,095 B1 | 7/2007 | Sun et al. |
| 7,241,209 B2 | 7/2007 | Wiltshire et al. |
| 8,740,669 B2 | 6/2014 | McFadden et al. |
| 10,144,106 B2 | 12/2018 | McLain et al. |
| 10,518,384 B2 * | 12/2019 | McLain ................. B24B 23/02 |
| 2004/0187324 A1 | 9/2004 | James et al. |
| 2005/0090190 A1 | 4/2005 | Rudolph |
| 2005/0197052 A1 | 9/2005 | Lampka et al. |
| 2005/0245182 A1 | 11/2005 | Deshpande et al. |
| 2007/0224924 A1 | 9/2007 | Hoglund |
| 2008/0057842 A1 | 3/2008 | Lampka et al. |
| 2017/0120413 A1 | 5/2017 | McLain et al. |

FOREIGN PATENT DOCUMENTS

| | | |
|---|---|---|
| EP | 1 688 217 | 8/2006 |
| EP | 2 127 808 | 12/2009 |
| GB | 2 420 518 | 5/2006 |
| JP | 2001-179591 | 7/2001 |
| WO | WO 99/21686 | 5/1999 |

\* cited by examiner

ADJUSTABLE STROKE MECHANISM FOR RANDOM ORBITAL MACHINE

CROSS-REFERENCE TO RELATED APPLICATIONS

This application is a continuation of U.S. Ser. No. 15/678,553, filed Aug. 16, 2017, which is a continuation-in-part of U.S. Ser. No. 15/339,317, filed Oct. 31, 2016, which claims the benefit of U.S. provisional application No. 62/249,521, filed on Nov. 2, 2015, and U.S. provisional application No. 62/340,335, filed on May 23, 2016, the entire contents of which are both hereby expressly incorporated by reference into this application.

BACKGROUND OF THE INVENTION

1. Field of the Invention

The present invention relates to a method and apparatus for adjusting the stroke on a random orbital machine, such as, but not limited to, polishing machines and sanding machines. This adjustment ability allows a user to define the stroke of the random orbital machine and adjust it between a maximum definitive stroke setting and minimum zero orbit setting.

2. Discussion of the Related Art

Polishing machines and sanding machines are routinely used in the automotive detailing industry and home building industry to correct imperfections in the paint or drywall and to apply polishes and waxes. There are three primary machines used, including rotary buffers, random orbital machines, and dual action machines. Each tool has its place, as the manner in which the pad spins on each machine is unique and used for different purposes.

Rotary buffers are the fastest and most effective machine for removing paint defects in a controlled manner with good results. The drive unit used in a rotary buffer is directly connected to the pad and each one is in axial alignment with each other. In order to correct paint scratches, the rotary buffer is commonly used to remove enough paint surrounding the scratches to make the surface level. Removing scratches, however, requires more skill and control of the machine than a typical hobbyist possesses. For this reason, rotary buffers are commonly avoided by average users as it is very easy to remove too much paint and damage the finish by causing swirl marks or by burning the paint.

Random orbital machines were introduced in order to meet the needs of an average user, as they require less experience and control to operate. A random orbital machine uses a gear case that employs two unique mechanisms which move a pad attached to a backing plate. Unlike a rotary buffer, random orbital machines place the central rotational axis of the pad and the backing plate offset from the driveshaft of the machine. This offset is commonly referred to as the "stroke". As a result, the backing plate and pad orbit the driveshaft in a circular motion. At the same time, the pad randomly spins, as it is mounted on an idle bearing. This random spinning varies with pressure applied on the pad and is not directly powered. The result is a polishing action that will not burn or cut through the paint as it will not produce the heat from a powered spinning action. Random orbital machines are, therefore, much safer and dramatically less likely to cause swirls or burn through the paint.

Similar to random orbital machines, dual action machines place the central rotational axis of the pad and the backing plate offset from the driveshaft. As a result of this stroke, the backing plate and pad orbit the driveshaft in a circular motion. However, with a dual action machine the spinning of the pad is directly powered.

At the heart of a random orbital machine is the machine's stroke. The stroke is determined by the offset between the driveshaft axis and the backing axis. A longer offset or stroke places the backing plate rotational axis farther away from the driveshaft axis. Multiplying the offset by two produces the stroke diameter. The "stroke" is, therefore, a term that identifies the diameter of the path the backing plate travels as it orbits around the driveshaft.

A majority of random orbital machines are small stroke machines, which mean they use a stroke length that measures somewhere between approximately 6 mm-12 mm. A small stroke machine limits the movement of the pad to a smaller and tighter orbit. This results in a smoother action. A small stroke machine is also easier to control because the backing plate orbits around the driveshaft rotational axis in a tighter path. There are less vibrations and movement making the machine easier to hold due to the smoother action.

A large stroke machine delivers increased orbits per minute (OPM) of backing plate motion using the same rotations per minute (RPM), as the orbit of the backing plate and the pad around the drive shaft is increased. A large stroke also increases movement of the pad which helps spread out polishing compounds and treats a larger surface area. It also accomplishes more cutting action into the paint which allows for scratches and paint defects to be corrected. Small stroke machines typically only polish the paint and do not cut into it, and, therefore, are not able to remove surface defects.

One method of addressing the deficiencies of a small stroke has been to increase the RPM of the machine. While this increases the rotation of the motor, the machine stroke stays the same. There are also longevity issues associated with increased RPM for the motor and increased OPM for the pad. Increasing the RPM puts more strain on the motor, while increased OPM burns out a pad faster.

In sum, both long stroke and short stroke machines have their place in the industry. Therefore, what is needed is a machine that can be adjusted by the user without special tools or disassembly of the machine. Finally, what is needed is a compact, simple, and effective method to adjust the stroke of a machine based on the needs of the user.

SUMMARY OF THE INVENTION

A random orbital machine that includes an adjustable stroke mechanism defined by the user with a housing configured to mount the adjustable stroke mechanism to the random orbital machine.

In accordance with a first embodiment of the invention, a random orbital machine includes an adjustable stroke mechanism, a gear case housing configured to mount the adjustable stroke mechanism, and a shroud is attached to the gear case and configured to enclose the adjustable stroke mechanism within the gear case. In order to adjust the stroke, a first gear with a first diameter and a counterweight attachment point is spaced apart from a central rotational axis of the first gear, a second gear with a second diameter equal to the first diameter and a backing plate attachment point is spaced apart from a central rotational axis of the second gear, and an idler gear is connected to the gear case engaging both the first gear and the second gear such that rotation of any of the first gear, second gear, and idler gear causes rotation in each one of the first, second, and idler gears. The random orbital machine further includes an adjustment bar with a fixed rotational axis attached to the gear case and a slot extending along a length of the adjustment bar. A counterweight is attached to the attachment point of the first gear through the groove in the adjustment bar and spaced from the rotational axis of the adjustment bar such that rotation of the first gear slides the counterweight attachment point along the groove. Further, a backing plate mount is attached to the attachment point of the second gear through the groove of the adjustment bar opposite the counterweight and spaced from the rotational axis of the adjustment bar such that rotation of the second gear slides the backing plate attachment point along the groove thus adjusting the stroke of the random orbital machine. A key on the underside of the counterweight fits within a groove in the adjustment bar and automatically aligns and pivots the counterweight as the first gear is rotated.

According to another embodiment of the invention, an adjustable stroke mechanism includes a gear case attached to a random orbital machine, an adjustment bar with a fixed rotational axis attached within the gear case, and a slot extending along a length of the adjustment bar. The adjustable stroke mechanism further includes counterweight with an attachment point slidably held within the groove in the adjustment bar and spaced from the rotational axis of the adjustment bar and a backing plate mount with an attachment point slidably held within the groove in the adjustment bar opposite the counterweight and spaced from the rotational axis of the adjustment bar, wherein movement of the backing plate mount along the groove of the adjustment bar causes equal and opposite movement of the counterweight along the groove of the adjustment bar.

In accordance with yet another embodiment of the invention, a method of adjusting a stroke of a random orbital machine includes rotating a first gear about a rotational axis within a gear case of the random orbital machine, rotating a counter weight about the rotational axis of the first gear, and sliding the counterweight along a groove along an adjustment bar as the first gear is rotated. The method further includes rotating the adjustment bar as the first gear is rotated about a rotational axis of the adjustment bar, rotating an idler gear meshed with the first gear as the first gear is rotated, rotating a second gear meshed with the idler gear about a rotational axis as the first gear is rotated, rotating a backing plate mount about the rotational axis of the second gear as the first gear is rotated, and sliding the backing plate mount along the groove along the adjustment bar as the second gear is rotated such that, as the backing plate mount moves along the groove in the adjustment bar, the counterweight moves along the adjustment bar it an equal and opposite direction.

According to yet another embodiment of the invention, an adjustable stroke mechanism includes a first rack gear with a first end and a second end opposite the first end, a second rack gear with a first end and a second end opposite the first end, and at least one pinion gear meshed with and between the first rack gear and the second rack gear. In addition, the adjustable stroke mechanism includes a counterweight attached to a first end of the first rack gear and a backing plate mount attached to the second end of the second rack gear, wherein rotation of the pinion gear moves the each one of the counterweight and the backing plate away or toward one another depending on the rotational direction of the pinion gear, thus adjusting the stroke and providing a proper counterweight balance.

In accordance with yet another embodiment of the invention, an adjustable stroke mechanism includes a housing having a circular wall enclosing a cavity, wherein the wall includes a plurality of apertures, and an adjuster ring surrounding an outer surface of the wall of the housing, the adjuster ring having a first set of gear teeth along a first portion of an inner surface of the adjuster ring and a second set of gear teeth along a second portion of the inner surface of the adjuster ring. Additionally, the adjustable stroke mechanism includes a counterweight disposed within the housing, the counterweight having an orifice formed therein and a set of gear teeth along an exterior surface thereof, and at least one counterweight gear disposed between the counterweight and the adjuster ring and within one of the plurality of apertures in the wall of the housing, the at least one counterweight gear configured to mesh with the first set of gear teeth of the adjuster ring and the set of gear teeth of the counterweight so that rotation of the adjuster ring causes movement of the counterweight. Further, the adjustable stroke mechanism includes a bearing carriage disposed within the housing, the bearing carriage having an orifice formed therein and a set of gear teeth along an exterior surface thereof, and at least one bearing carriage gear disposed between the bearing carriage and the adjuster ring and within another of the plurality of apertures in the wall of the housing, the at least one bearing carriage gear configured to mesh with the second set of gear teeth of the adjuster ring and the set of gear teeth of the bearing carriage so that rotation of the adjuster ring causes movement of the bearing cage.

In accordance with yet another embodiment of the invention, a method of adjusting a stroke of a random orbital machine includes coupling an adjustable stroke mechanism to a random orbital machine. The adjustable stroke mechanism includes a housing with a circular wall enclosing a cavity, an adjuster ring surrounding an outer surface of the circular wall, a counterweight disposed within the cavity, a counterweight gear disposed within the cavity, a bearing carriage disposed within the cavity, a bearing carriage gear disposed within the cavity, and a bearing axle coupled to the bearing carriage. The method further includes rotating the adjuster ring. The adjuster ring has a first set of gear teeth along a first portion of an inner surface of the adjuster ring and a second set of gear teeth along a second portion of the inner surface of the adjuster ring. Rotating the adjuster ring causes the counterweight gear to rotate and the counterweight to move. The counterweight gear is configured to mesh with the first set of gear teeth of the adjuster ring. The counterweight has a set of gear teeth configured to mesh with the counterweight gear. Rotating the adjuster ring causes the bearing carriage gear to rotate and the bearing carriage to move. The bearing carriage gear is configured to mesh with the second set of gear teeth of the adjuster ring. The bearing carriage has a set of gear teeth configured to mesh with the bearing carriage gear.

In accordance with yet another embodiment of the invention, an adjustable stroke mechanism for a random orbital machine includes a first gear, a counterweight coupled to the first gear, a second gear, and a backing plate mount in connection with second gear. The backing plate is configured to move in response to movement of the second gear. Further, rotation of one of the first gear and the second gear causes rotation of the other of the first gear and the second gear.

In addition, the adjustable stroke mechanism may include a bearing carriage including a plurality of gear teeth configured to interfit with a plurality of gear teeth of the second gear. The counterweight includes a plurality of gear teeth configured to interfit with a plurality of gear teeth of the first gear. A bearing axle is disposed within an orifice of the bearing carriage, the bearing axle includes the backing plate mount. The first gear, the counterweight, the second gear, and the bearing carriage are disposed within a housing.

Further, the adjustable stroke mechanism may include an adjuster ring surrounding an outer wall of the housing. The adjuster ring includes a first set of gear teeth along a first portion of an inner surface of the adjuster ring and a second set of gear teeth along a second portion of the inner surface of the adjuster ring. The first set of gear teeth are configured to interfit with the plurality of gear teeth of the counterweight. The second set of gear teeth configured to interfit with the plurality of gear teeth of the bearing carriage.

The adjuster ring is rotatable between a plurality of predetermined positions. Rotating the adjuster ring causes the first gear to rotate and the second gear to rotate. Rotating the first gear causes the counterweight to move. Rotating the second gear causes the bearing carriage and bearing axle to move.

Additionally, the backing plate mount may include at least one of an inner thread and an outer thread configured to couple to adjustable stroke mechanism to a tool.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

Figure 1:
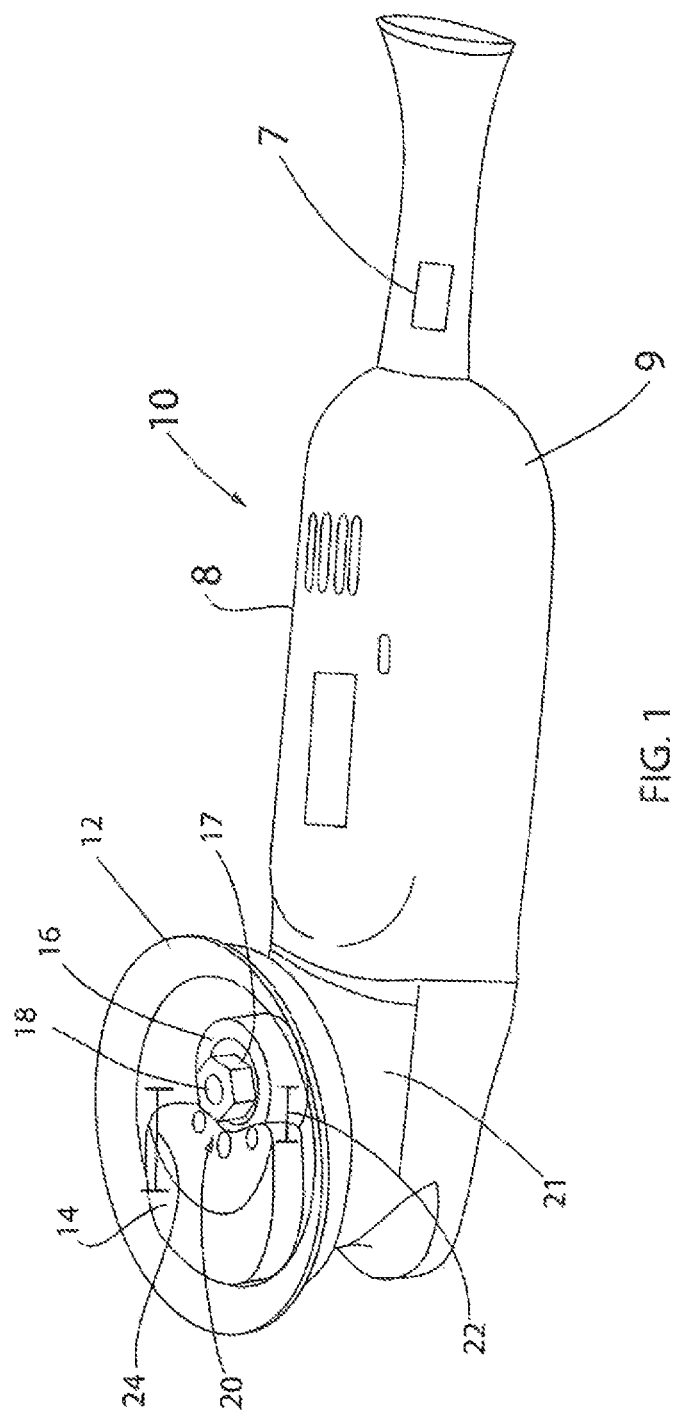
FIG. 1 is a raised perspective view of a known, prior art, random orbital machine.

In describing the preferred embodiments of the invention which are illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION OF PREFERRED EMBODIMENTS

The present invention and the various features and advantageous details thereof are explained more fully with reference to the non-limiting embodiments described in detail in the following description.

FIG. 1 depicts a known random orbital machine 10 with a conventional, fixed stroke. The random orbital machine 10 is operated by plugging in the power delivery device 9, which, in this case, is an electrical cord. The switch 7 may be depressed, which energizes the motor 8 that causes a driveshaft (not pictured) to rotate. A gear case 21 attaches to a shroud 12 and contains a counterweight 14 and backing plate mount 17 assembly.

The driveshaft has a rotational axis 20 which is offset from the backing plate axis 18. The backing plate mount 17 orbits about the driveshaft axis once for every revolution of the driveshaft. This is due to the offset which is measured by the stroke radius 22. The stroke diameter 24 is calculated by multiplying the stroke radius 22 by two, and this number is commonly used and referred to as the stroke of the random orbital machine 10. A backing plate bearing 16 allows the backing plate mount 17 to freely spin at random during the orbital action. In order to prevent substantial vibrations due to the stroke radius 22, a counterweight 14 is provided. The counterweight 14 is calculated to have a mass and center of mass that is offset from the driveshaft axis, which may be aligned or offset from the rotational axis 20 of the adjustment bar 34, such that it counteracts the vibrations caused due to the orbiting backing plate mount 17 and stroke radius 22. Each one of the rotating components of the random orbital machine 10 is located within a shroud 12 that prevents foreign bodies or the user's finger(s) from damage during use.

Figure 2:
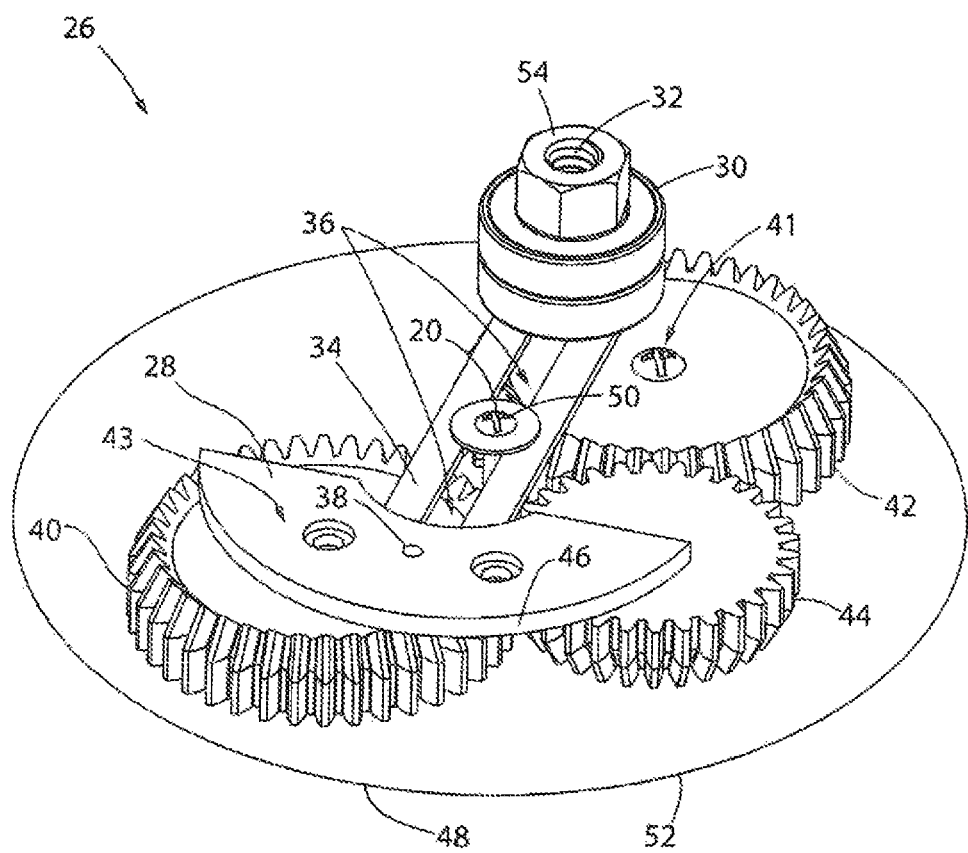
FIG. 2 is a raised perspective view of a first embodiment of an adjustable stroke mechanism for a random orbital machine showing an adjustable counterweight and adjustable backing plate mount.

Moving on to FIG. 2, a first embodiment of an adjustable stroke mechanism 26 is shown. The adjustable stroke mechanism 26 utilizes a series of gears to allow the backing plate mount 54 and counterweight 28 to automatically move toward or away from one another as any one of the gears is rotated. These synched movements of the backing plate mount 54 and the counterweight 28 allow the offset, or stroke, of a random orbital machine 10 to be adjusted while keeping vibrations in check. The offset may be adjusted between a maximum and minimum setting, or be adjustable by choosing a series of pre-selected settings.

A shroud will enclose the adjustable stroke mechanism 26 and is represented by a proposed shroud perimeter 48. The shroud would function much as the shroud 12 shown in FIG. 1 and will enclose the components of the adjustable stroke mechanism 26. The proposed shroud curvature 52 may also be matched to the counterweight curvature 46 such that the counterweight 28 will not intersect the proposed shroud perimeter 48 during operation.

The entire contents within the proposed shroud perimeter 48 rotate and are all intended to be placed within the shroud 12 much as shown in FIG. 1. For this reason, special care must be taken to ensure the counterweight 28 is always oriented in the proper direction and that its center of mass is always properly spaced from the backing plate axis 32 as the stroke is adjusted.

In order to adjust the stroke on the adjustable stroke mechanism 26, any one of a first gear 40, second gear 42, or idler gear 44 may be rotated. The first gear 40 meshes with the idler gear 44 and the idler gear 44 meshes with the second gear 42. The first gear 40 rotates about a first gear rotational axis 43 (at a central point of the first gear 40, which is obstructed from view) and the second gear 42 rotates about a second gear rotational axis 41. This rotation causes a subsequent rotation of any one of the gears, which causes all three gears to rotate. This rotational motion of the first gear 40 and second gear 42 is transferred to a movement of the counterweight 28 and backing plate mount 54, respectively. The rotational motion of the gears is transferred by not only the idler gear 44, but also by an adjustment bar 34. The adjustment bar 34 includes a groove 36 along its length. The backing plate mount 54 attaches to the second gear 42 through the groove 36 in the adjustment bar 34. A key 35, seen in FIG. 4, on the back of the counterweight 28 rides in the groove 36 of the adjustment bar 34 and ensures that the counterweight 28 is always oriented in the right direction to eliminate vibrations. The counterweight attachment point 38 passes through a bore 37 in the key 35 and allows the counterweight 28 to freely pivot about the counterweight attachment point 38.

Figure 3:
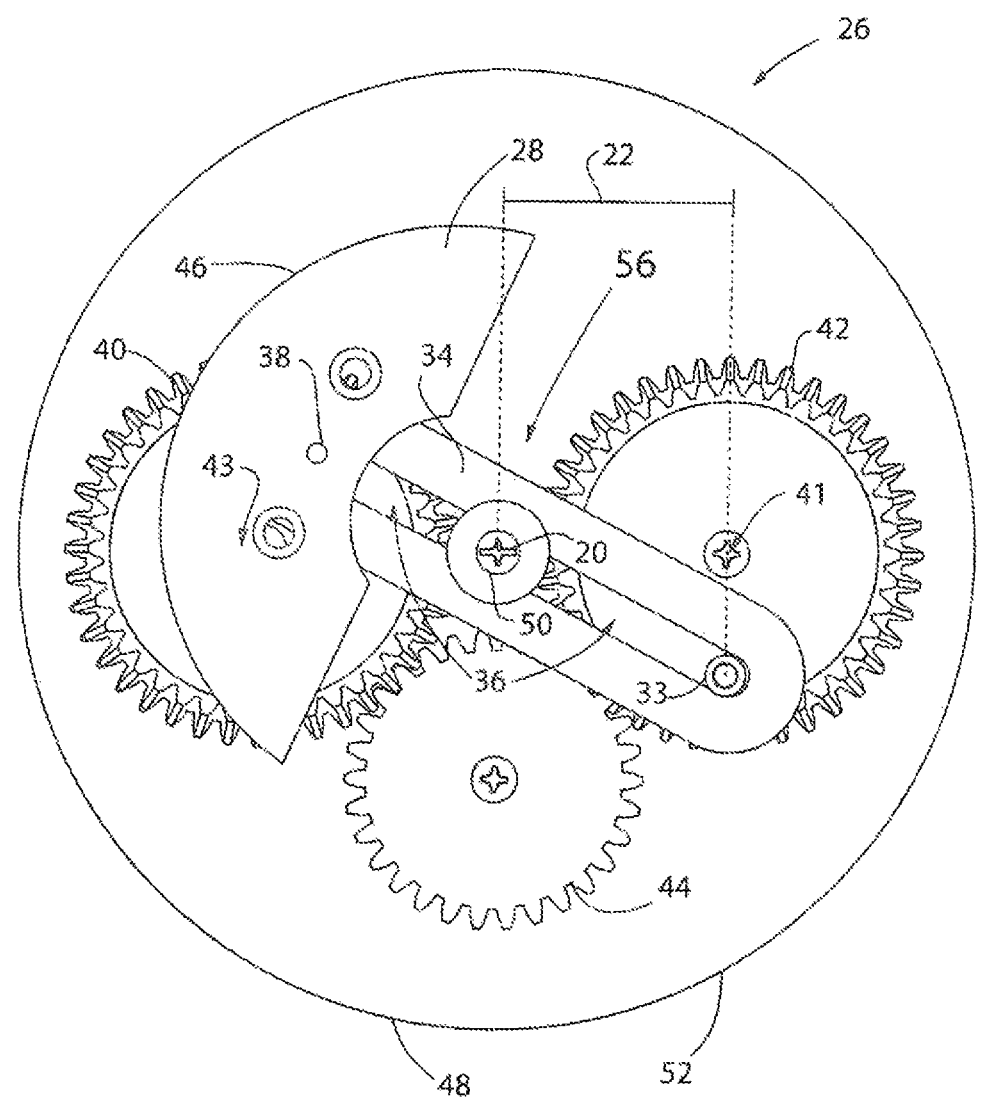
FIG. 3 is a top view of the adjustable stroke mechanism of FIG. 2 in a fully extended stroke position and with the backing plate mount removed.

FIG. 3 also shows a bearing 30 which allows the backing plate mount 54 to spin freely about a backing plate axis 32. When a backing plate is secured to the backing plate mount, a pad may be attached to the backing plate. The pad will then spin freely and randomly about the backing plate axis 32.

Figure 4:
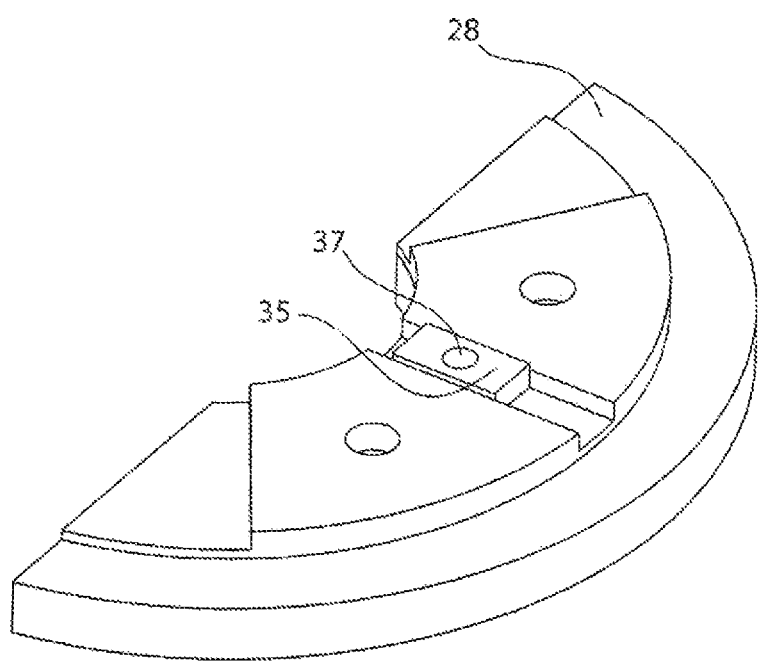
FIG. 4 is a bottom view of the counterweight of FIG. 2.

As the counterweight attachment point 38 is not in the center of the first gear 40, the counterweight attachment point 38 orbits around the center of the first gear 40 as the first gear 40 is rotated. This orbital motion pushes on the adjustment bar 34 and causes the backing plate mount 54 to also orbit around the center of the second gear 42. This happens because the backing plate mount 54 is fastened to the second gear 42, as shown in FIG. 3. The backing plate attachment point 33 passes through the groove 36 and pivots the adjustment bar 34 as the second gear 42 rotates. This motion causes the counterweight 28 to always remain aligned, as it pivots on the counterweight attachment point 38. The key 35, as shown in FIG. 4, rides in the groove 36. As a result, the counterweight 28 balances out the adjustable stroke mechanism 26 regardless of the stroke setting.

FIG. 3 shows a fully extended stroke 56. The backing plate attachment point 33 is adjusted such that the stroke radius 22 is fully extended. In this position, the backing plate attachment point 33 is fully extended to the end of the groove 36 in the adjustment bar 34. The adjustment bar attachment point 50 holds the adjustment bar 34 to the adjustable stroke mechanism 26, spaced above the first gear 40, second gear 42, and idler gear 44.

The counterweight 28 is also fully extended, and the key 35 is at the end of the groove 36 on the opposite side of the backing plate attachment point 33. The shape of the key 35 fits snugly in the groove 36 and maintains any point on the counterweight 28 facing the same point on the backing plate attachment point 33.

Figure 5:
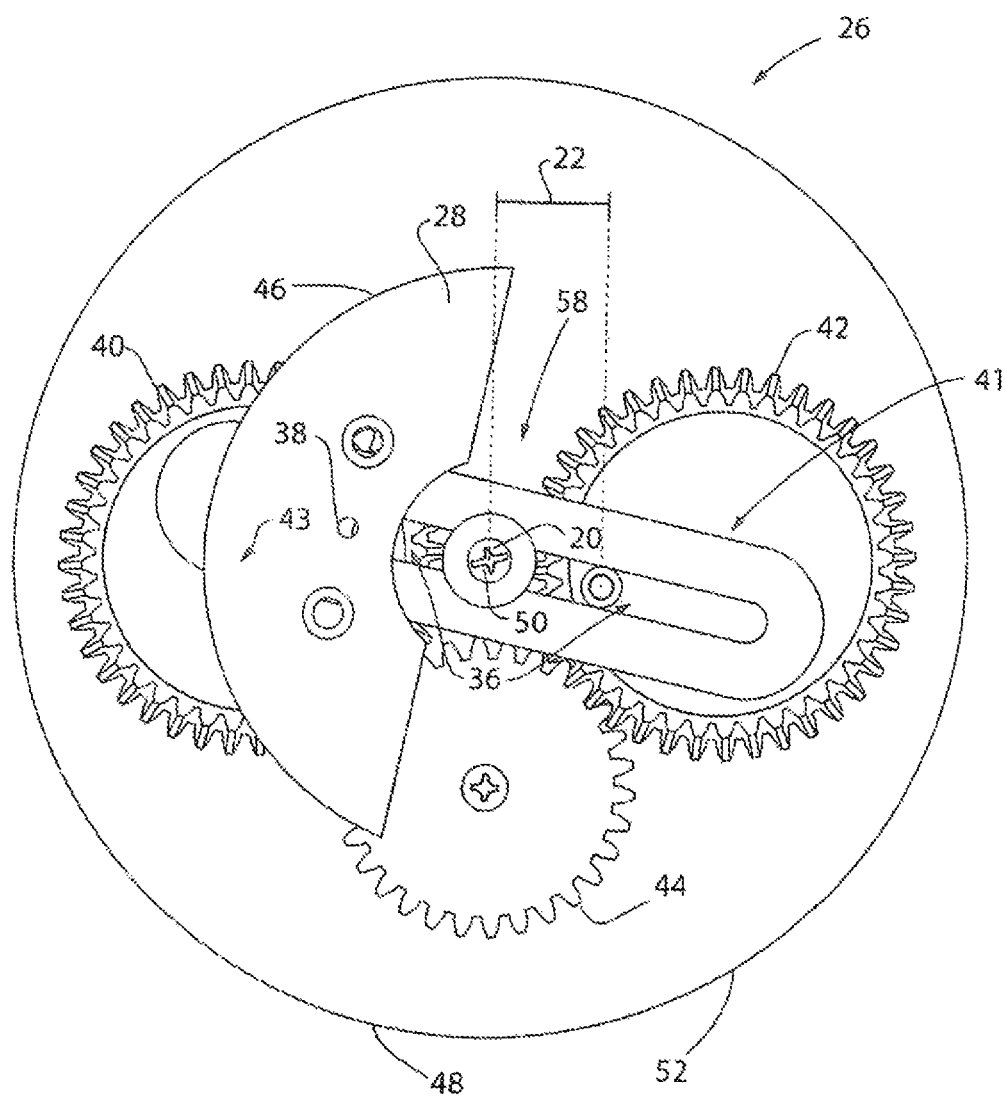
FIG. 5 is a top view of the adjustable stroke mechanism of FIG. 2 in a fully retracted stroke position and with the backing plate mount removed.

FIG. 5, for example, shows a fully retracted stroke 58. The stroke radius 23 in FIG. 5 is less than the stroke radius 22 in FIG. 3. This is due to rotation of any one of the first gear 40, second gear 42, and idler gear 44. The first gear 40 and the second gear 42 are preferably the same diameter. The backing plate attachment point 33 is also spaced away from the center of the second gear 42 the same distance as the counterweight attachment point 38 is spaced from the center for the first gear 40. This ensures that the counterweight 28 moves at the same rate as the backing plate mount 54 as any of the gears are rotated. This maintains proper balance despite changing the stroke length.

Figure 6:
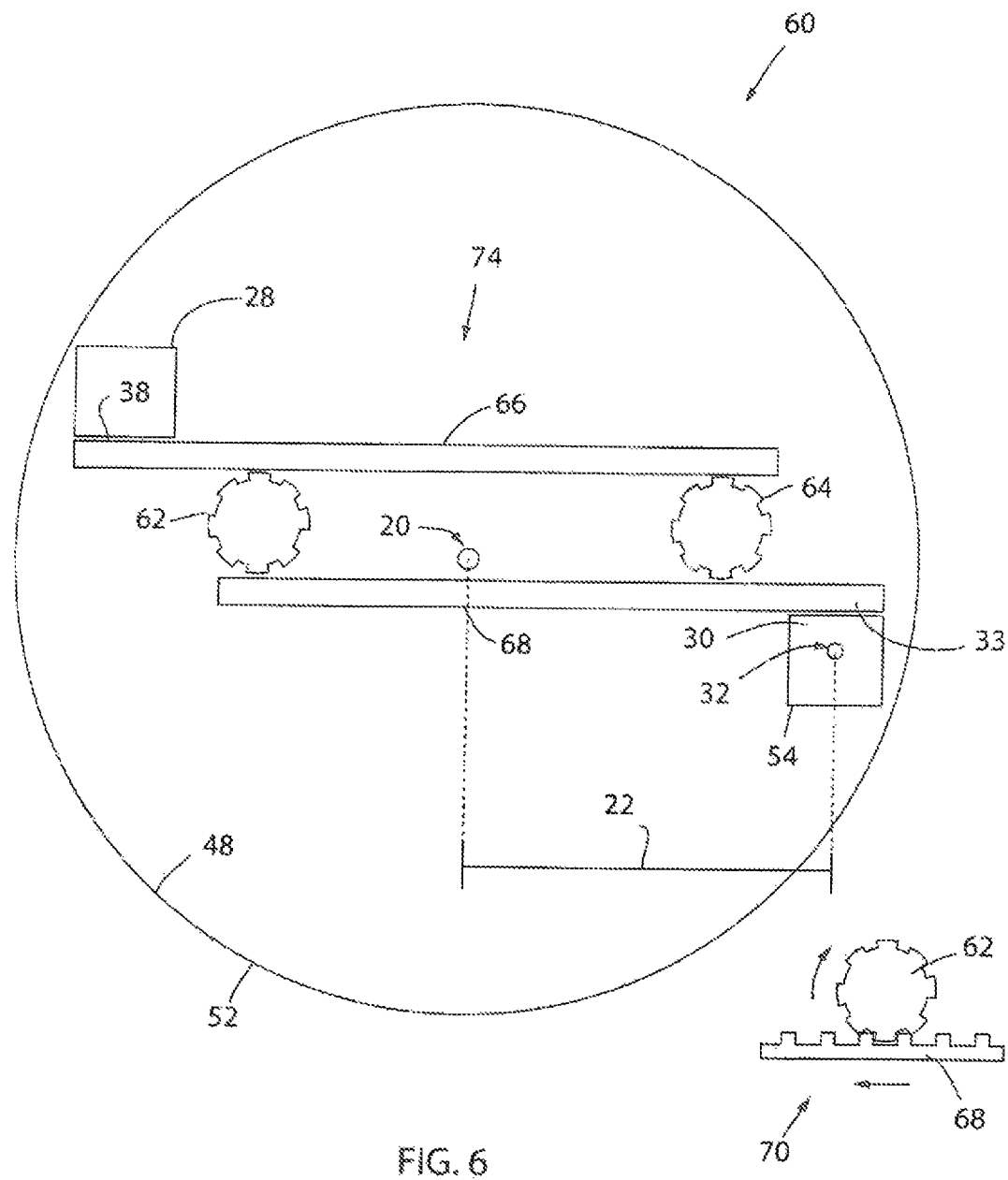
FIG. 6 is a top view of a second embodiment of an adjustable stroke mechanism for a random orbital machine shown in a fully extended stroke position.

Transitioning now to FIG. 6, a second embodiment of an adjustable stroke mechanism 60 is shown. The adjustable stroke mechanism 60 is represented within the perimeter of a shroud 48, similar to the known random orbital machine 10 in FIG. 1. The proposed shroud perimeter 48 also has a proposed shroud curvature 52 that houses the entire adjustable stroke mechanism 60. The entire adjustable stroke mechanism 60 rotates within the proposed shroud perimeter 48 when the random orbital machine 10 is activated by depressing the switch 7.

A fully extended stroke 74 is shown in FIG. 6. The stroke radius 22 is shown by the offset of the backing plate mount 54 to the rotational axis 20 of the backing plate mount 54. The counterweight 28 balances out the backing plate mount 54 such that minimal vibrations are experienced when the adjustable stroke mechanism 60 is activated.

The stroke radius 22 is adjusted by movement of a first rack gear 66, a second rack gear 68, a first pinion gear 62, and a second pinion gear 64. It is envisioned that a single pinion gear may also be used to adjust the stroke radius 22 as well. Both the first rack gear 66 and the second rack gear 68 have teeth along the length of the respective gears. The first pinion gear 62 and the second pinion gear 64 have corresponding and meshed teeth. As a result, when either one of the first pinion gears 62 and second pinion gears 64 are rotated, the first rack gear 66 and the second rack gear 68 also move in opposing directions. This motion is exemplified, for example, in the illustration 70. In the illustration 70, it is shown that as the second rack gear 68 moves to the left, the first pinion gear 62 rotates clockwise. Moving the first pinion gear 62 counter clockwise would cause the second rack gear 68 to move to the right.

As the counterweight 28 is secured to the first rack gear by a counterweight attachment point 38, and the backing plate mount 54 is secured to the second rack gear 68 with a backing plate attachment point 33, the stroke radius 22 may be easily adjusted. Also, as the stroke radius 22 is adjusted, the counterweight 28 is automatically kept at the desired distance from the rotational axis 20 to balance out the orbital motion of the backing plate mount 54.

Figure 7:
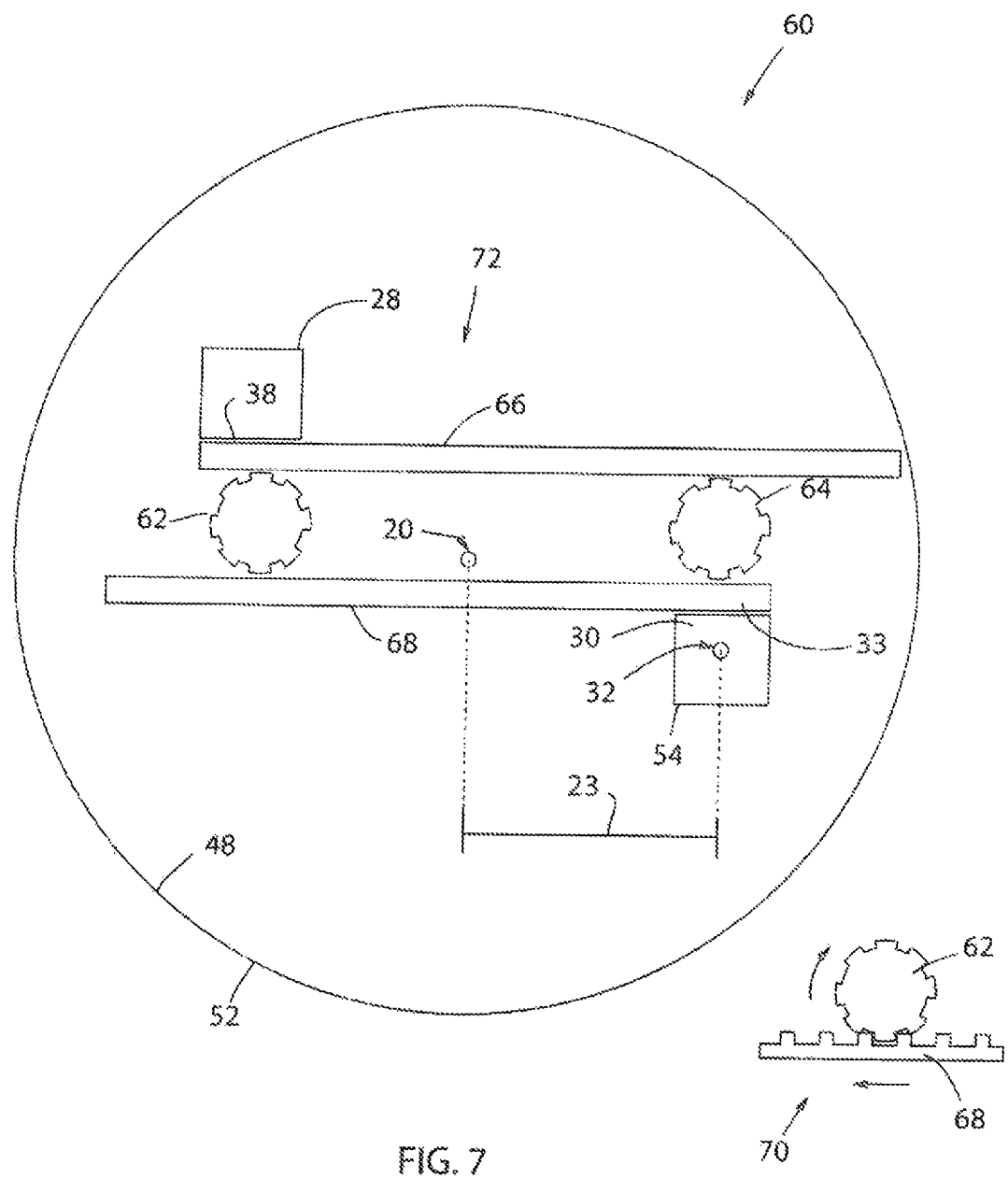
FIG. 7 is a top view of the adjustable stroke mechanism of FIG. 6 in a fully retracted stroke position.

FIG. 7 shows the fully retracted stroke 72. When the stroke is fully retracted, the stroke radius 23 is seen as shorter, as the offset between the backing plate axis 32 and the rotational axis 20 of the adjustable stroke mechanism 60 is lessened. Just as with respect to FIG. 2, the embodiment shown in FIG. 6 and FIG. 7 also has a bearing 30 to which the backing plate mount 54 is attached. The bearing 30 allows the backing plate mount to freely spin at random about the backing plate axis 32 as it orbits the rotational axis 20. Either one of the embodiments discussed herein also allows the stroke to be adjusted anywhere between the fully retracted 72 and fully extended strokes 74.

Figure 8:
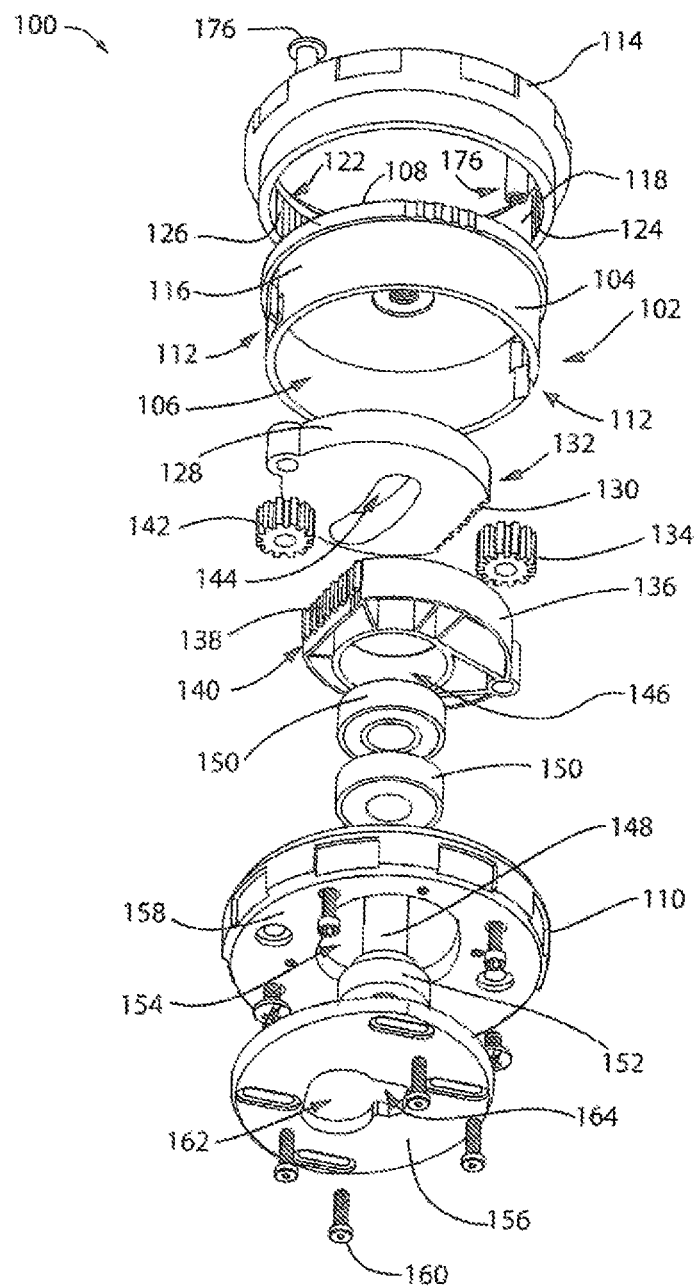
FIG. 8 is an exploded perspective view of a third embodiment of an adjustable stroke mechanism for a random orbital machine, according to the present invention.

Referring now to FIG. 8, a third embodiment of an adjustable stroke mechanism 100 is shown in an exploded perspective view in order to show the various components within the adjustable stroke mechanism 100. The adjustable stroke mechanism 100 includes a housing 102 having a wall 104 surrounding a cavity 106. As shown in FIG. 8, the wall 104 is depicted as circular in shape; however, the wall 104 could be in the form of any number of shapes. In addition, the housing 102 includes a top plate 108 oriented perpendicular to the wall 104, which provides an upper limit to the cavity 106. The housing 102 also includes a housing cover 110 oriented perpendicular to the wall 104 and opposite the top plate 108, which provides a lower limit to the cavity 106. The wall 104 of the housing 102 has a plurality of apertures 112 formed therein. While FIG. 8 shows two (2) apertures 112 formed in the wall 104, it is contemplated that either more or less than two (2) apertures 112 may be formed in the wall 104.

An adjuster ring 114 surrounds an outer surface 116 the wall 104 of the housing 102. An inner surface 118 of the adjuster ring 114 includes a first portion 120 and a second portion 122. A first set of gear teeth 124 is positioned along the first portion 120 of the inner surface 118 of the adjuster ring 114. Similarly, a second set of gear teeth 126 is positioned along the second portion 122 of the inner surface 118 of the adjuster ring 114. As shown in FIG. 8, the adjuster ring 114 and the housing 102 are aligned so that first and second sets of gear teeth 124, 126 line up with the plurality of apertures 112.

In one embodiment of the invention, the first and second sets of gear teeth 124, 126 are formed in the inner surface 118 of the adjuster ring 114; however, it is also contemplated that the first and second sets of gear teeth 124, 126 may be a separate piece attached to the inner surface 118 of the adjuster ring 114. Further, while FIG. 8 depicts the first and second portions 120, 122 as being only segments of the entire inner surface 118 of the adjuster ring 114, it is also contemplated that the first and second portions 120, 122 may cover the entire inner surface 118 of the adjuster ring 114. In turn, alternative embodiments of the invention may include first and second sets of gear teeth 124, 126 covering the entirety of the inner surface 118 of the adjuster ring 114.

As shown in FIG. 8, various additional components are placed with the cavity 106 of the housing 102. A counterweight 128 is disposed within the cavity 106 of the housing 102. The counterweight 128 includes a set of gear teeth 130 formed on an outer surface 132 of the counterweight 128. A counterweight drive gear 134 is placed between the counterweight 128 and the inner surface 118 of the adjuster ring 114. In particular, the counterweight drive gear 134 meshes with the first set of gear teeth 124 of the adjuster ring 114 and the set of gear teeth 130 of the counterweight 128. In addition, the counterweight drive gear 134 is configured to sit within one of the plurality of apertures 112 in the wall 104 of the housing 102. As such, rotation of the adjuster ring 114 results in movement of the counterweight 128 by way of rotation of the counterweight drive gear 134.

A bearing carriage 136 is also disposed within the cavity 106 of the housing 102. Similar to the counterweight 128, the bearing carriage 136 includes a set of gear teeth 138 formed on an outer surface 140 thereof. A bearing carriage drive gear 142 is placed between the bearing carriage 136 and the inner surface 118 of the adjuster ring 114. That is, the bearing carriage drive gear 142 meshes with the second set of gear teeth 126 of the adjuster ring 114 and the set of gear teeth 138 of the bearing carriage 136. Further, the bearing carriage drive gear 142 is configured to sit within another of the apertures 112 formed in the wall 104 of the housing 102. As a result, rotation of the adjuster ring 114 also results in movement of the bearing carriage 136 by way of rotation of the bearing carriage drive gear 142.

While FIG. 8 depicts the counterweight drive gear 134 as a single gear, it is contemplated that the counterweight drive gear 134 may be a plurality of gears configured to change the gear ratio between rotation of the adjuster ring 114 and movement of the counterweight 128. Likewise, in alternative embodiments of the invention, the bearing carriage drive gear 142 may be a plurality of gears configured to change the gear ratio between rotation of the adjuster ring 114 and movement of the bearing carriage 136.

The counterweight 128 and the bearing carriage 136 may also include a respective orifice 144, 146 formed therein. In this instance, a bearing axle 148 extends through both the orifice 144 of the counterweight 128 and the orifice 146 of the bearing carriage 136. Further, the bearing axle 148 is surrounded by at least one bearing 150, which is disposed within the orifice 146 of the bearing carriage 136. The bearing axle 148 also includes a backing plate mount 152, which extends out of the cavity 106 through an orifice 154 formed in the housing cover 110. The backing plate mount 152 is configured in such a way as to allow attachment to a tool, such as, but not limited to, a buffing pad.

During operation of the adjuster ring 114, the bearing axle 148 moves with the bearing carriage 136. As such, the orifice 144 formed in the counterweight 128 is configured to allow the bearing axle 148 to move with the bearing carriage 136, as the counterweight 128 itself moves in a different direction.

In certain embodiments of the invention, the adjustable stroke mechanism 100 may include a locking plate 156. The locking plate 156 may be secured to an outer surface 158 of the housing cover 110 via a plurality of fasteners 160, such as, but not limited to, screws. While FIG. 8 depicts the use of four (4) fasteners 160, one skilled in the art would readily recognize that more or less than four (4) fasteners 160 may be used to secure the locking plate 156 to the housing cover 110. The locking plate 156 has an orifice 162 formed therein, which is, configured to have the backing plate mount 152 disposed within the orifice 162. The locking plate 156 is configured to be transitionable between an unlocked position 192 and a locked position 191. In the unlocked position 192, the adjuster ring 114 is able to be rotated, and, therefore, the bearing axle 148 is able to be moved between a number of predetermined positions to adjust the stroke. In the locked position 191, a notch 164 in the orifice 162 engages the backing plate mount 152, which prevents movement of the backing plate mount 152. In turn, this prevents movement of the bearing axle 148, which prevents movement of the bearing carriage 136, which, in turn, prevents movement of the adjuster ring 114.

Figure 9:
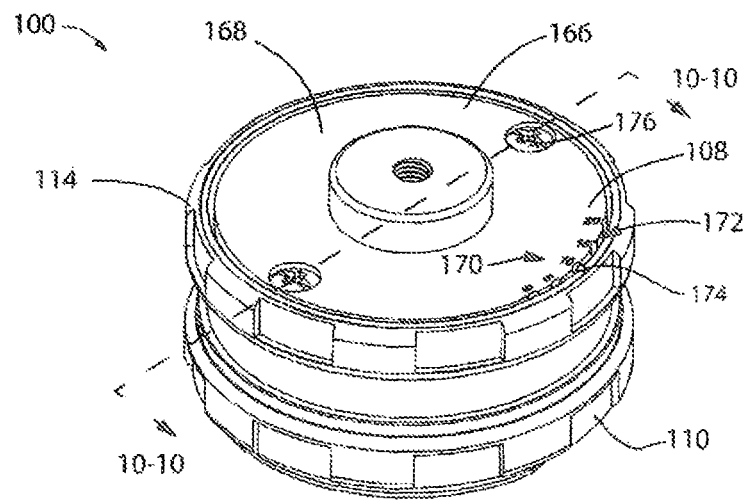
FIG. 9 is a perspective view of the adjustable stroke mechanism of a random orbital machine of FIG. 8.

FIG. 9 illustrates a perspective view of the adjustable stroke mechanism 100 completely assembled. According to an embodiment of the invention, a mount 166 is formed on the outer surface 168 of the top plate 108 of the housing 102. In particular, the mount 166 is configured to interact with a random orbital machine, in order to attach the adjustable stroke mechanism 100 to the random orbital machine. In one embodiment of the invention, the mechanism 100 is housed within a shroud of the random orbital machine, similar to the shroud 12 shown in FIG. 1.

In alternative embodiments of the invention, the shroud may include a plurality of lights, such as LEDs, to illuminate the working surface for a user. In addition, the random orbital machine may also include a temperature sensor, such as an infrared temperature sensor, and/or a gloss meter in order to track the temperature and/or the reflection gloss of the working surface. It is contemplated that the addition of a plurality of lights and a temperature sensor such as described above can be included in any of the embodiments of the invention.

FIG. 9 further shows markings 170 indicating the predetermined rotation locations of the adjuster ring 114. In one embodiment of the invention, the markings 170 correspond to indentions 172 along the circumference of the top plate 108 of the housing 102. Further, the adjuster ring 114 includes a detent 174 which interacts with a respective one of the indentations 172 as the adjuster ring 114 is rotated between predetermined positions. As a result, a user is given feedback regarding positioning of the stroke mechanism 100 in a predetermined position. This feedback may be tactile, audible, or both, as a result of the detent 174 interacting with one of the indentations 172.

Figure 10:
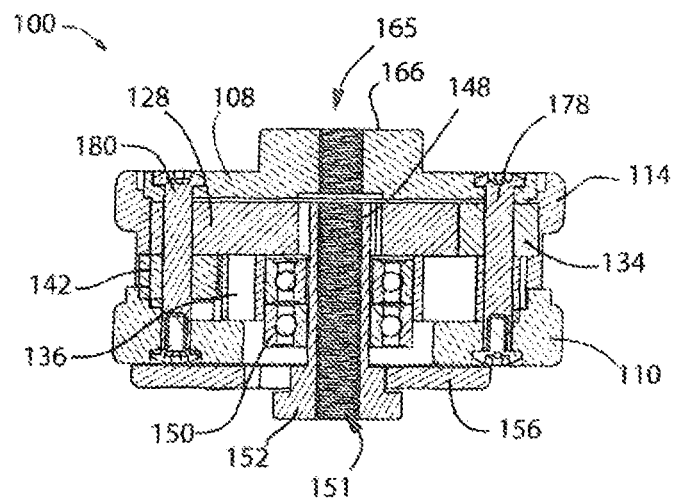
FIG. 10 is a side sectional view taken along line 10-10 of the adjustable stroke mechanism of a random orbital machine of FIG. 9.

Next, FIG. 10 illustrates a cross-sectional view of FIG. 9 taken along line 10-10. This view illustrates the relationship of parts within the cavity 106, as described above. In addition, the housing 102 and the housing cover 110 are coupled to each other by a plurality of fasteners 176, such as but not limited to the screws shown in the figures. In addition, fasteners 176 provide a pivot axle for certain components 128, 134, 136, 142 of the stroke mechanism 100 and help maintain the alignment of these components 128, 134, 136, 142.

For example, a first fastener 178 of the plurality of fasteners 176 acts as a pivot point for the bearing carriage 136 and an axis of rotation for the counterweight drive gear 134. Meanwhile, a second fastener 180 of the plurality of fasteners 176 acts as a pivot point for the counterweight 128 and an axis of rotation for the bearing carriage drive gear 142. In alternative embodiments, it is contemplated that a separate fastener may be used for each pivot point and axis of rotation.

As shown in FIG. 10, an inner thread 165 may be disposed within the mount 166, in order to assist with coupling the adjustable stroke mechanism 100 to the random orbital machine. However, it is contemplated that other coupling means may be used in place of the inner thread 165. Additionally, FIG. 10 shows an inner thread 151 disposed within the backing plate mount 152, in order to assist with coupling the adjustable stroke mechanism 100 to a tool. It is also contemplated that other coupling means may be used in place of the inner thread 151.

Figure 11:
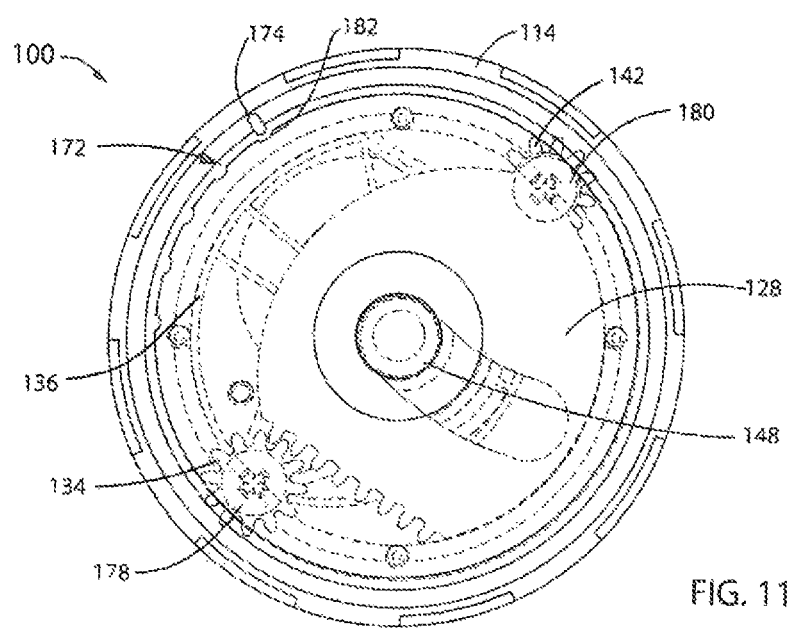
FIG. 11 is a top view of the adjustable stroke mechanism of FIG. 9 in a first position.
Figure 12:
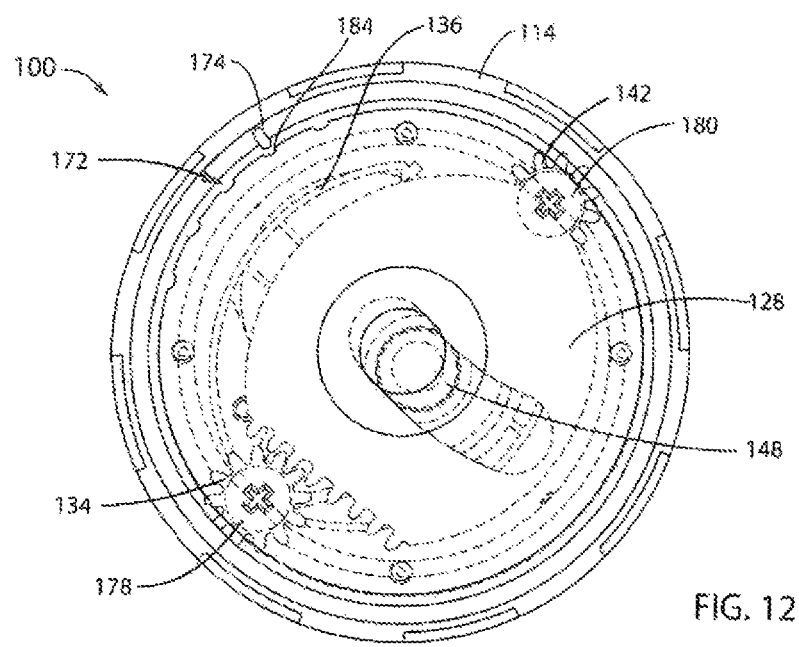
FIG. 12 is a top view of the adjustable stroke mechanism of FIG. 9 in a second position.
Figure 13:
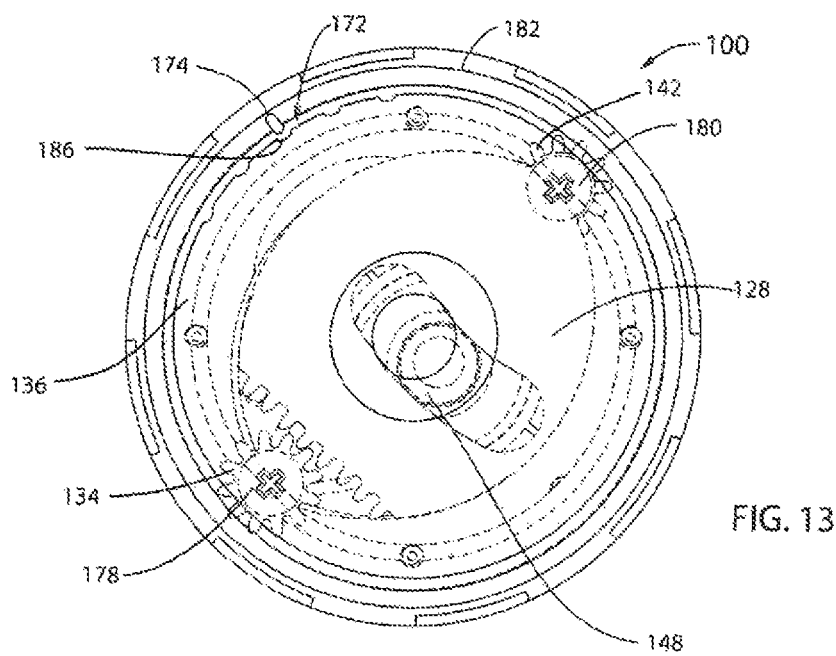
FIG. 13 is a top view of the adjustable stroke mechanism of FIG. 9 in a third position.
Figure 14:
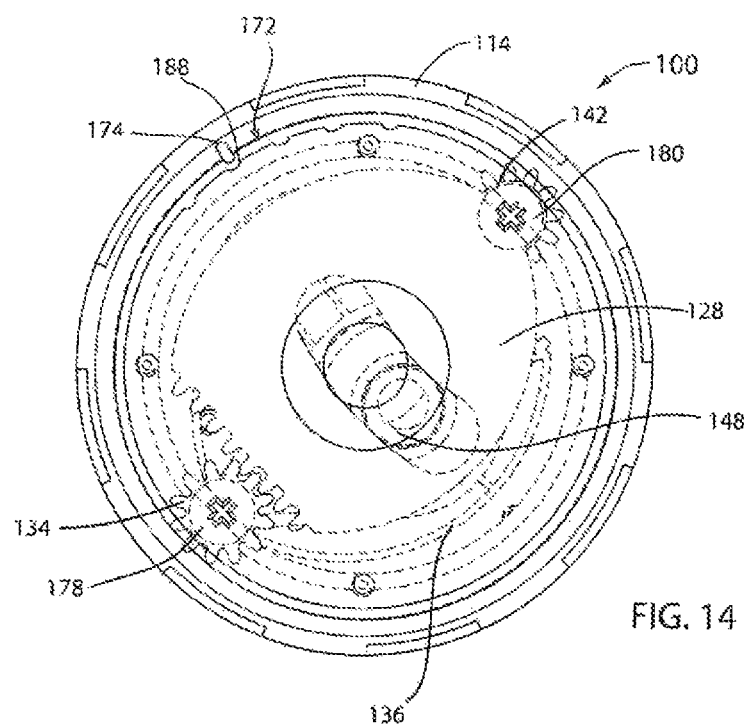
FIG. 14 is a top view of the adjustable stroke mechanism of FIG. 9 in a fourth position.
Figure 15:
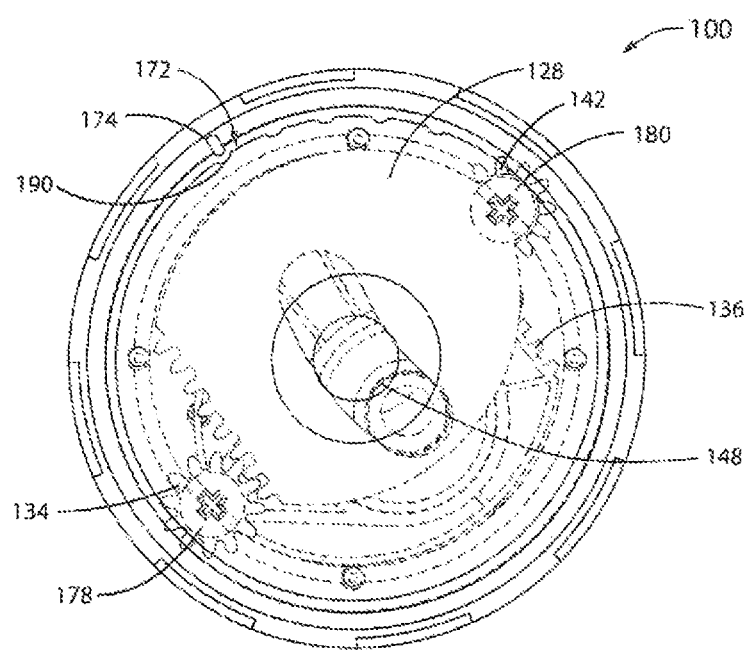
FIG. 15 is a top view of the adjustable stroke mechanism of FIG. 9 in a fifth position.

FIGS. 11-15 show a top view of the adjustable stroke mechanism 100 in a plurality of predetermined locations. The combination of figures illustrates the movement of the counterweight 128 and the movement of the bearing carriage 136 and bearing axle 148 as the adjuster ring 114 is rotated, resulting in a change in stroke. As seen in FIG. 11, the detent 174 is engaged in a first indentation 182 of the plurality of indentations 172 to signify that the adjuster ring 114 is in a first position. FIG. 12 shows the detent 174 engaged in a second indentation 184 of the plurality of indentations 172 to signify that the adjuster ring 114 is in a second position. FIG. 13 depicts the detent 174 engaged in a third indentation 186 of the plurality of indentations 172 to signify that adjuster ring 114 is in a third position. FIG. 14 shows the detent 174 engaged in a fourth indentation 188 of the plurality of indentations 172 to signify that the adjuster ring 114 is in a fourth position. FIG. 15 illustrates the detent 174 engaged in a fifth indentation 190 to signify that the adjuster ring 114 is in a fifth position.

While the figures depict five (5) indentations 172 to signify five (5) predetermined positions of the adjuster ring 114, it is contemplated that more or less than five (5) indentations 172 may be used to signify more or less than five (5) predetermined positions of the adjuster ring 114.

Figure 16:
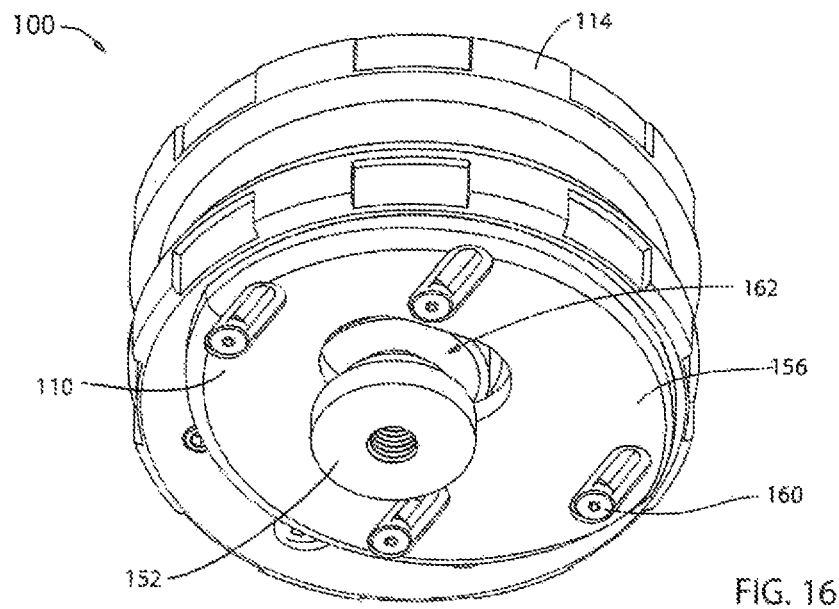
FIG. 16 is a bottom perspective view of the adjustable stroke mechanism of FIG. 9 in a first position with the locking plate in a locked position.
Figure 17:
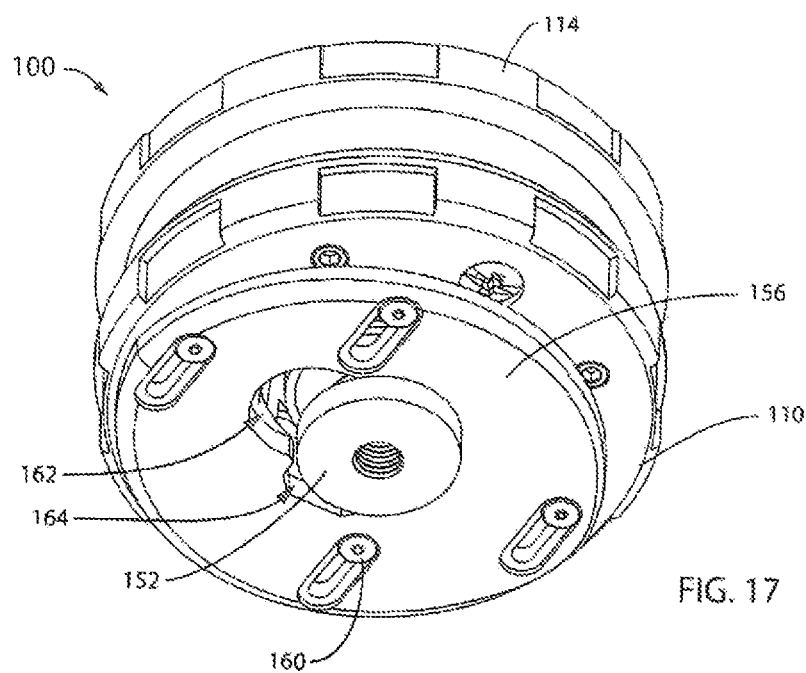
FIG. 17 is a bottom perspective view of the adjustable stroke mechanism of FIG. 9 in a first position with a locking plate in an unlocked position.
Figure 18:
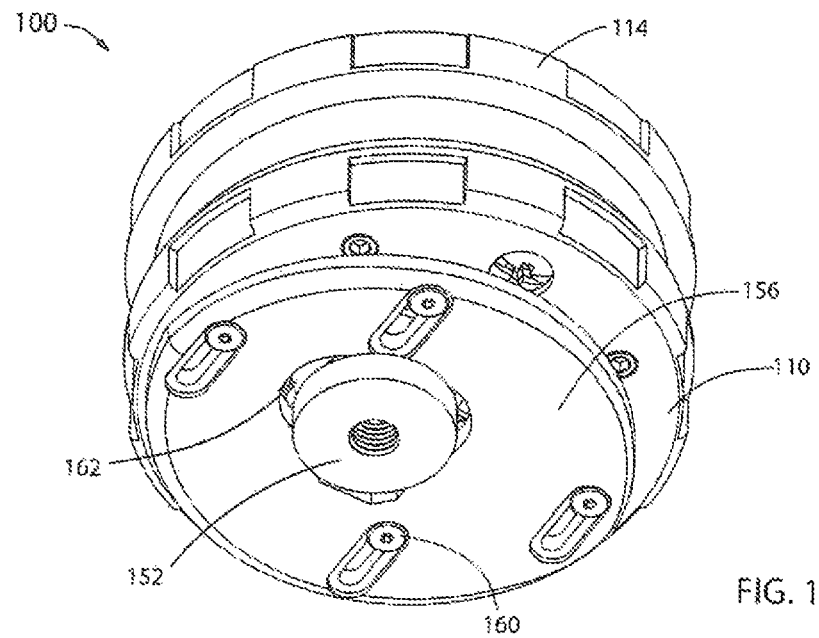
FIG. 18 is a bottom perspective view of the adjustable stroke mechanism of FIG. 9 in a second position.
Figure 19:
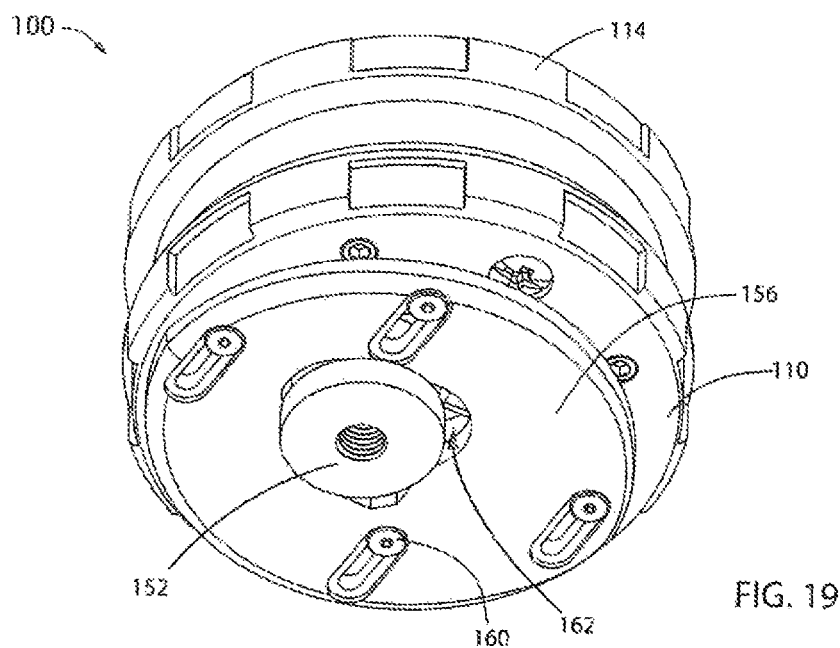
FIG. 19 is a bottom perspective view of the adjustable stroke mechanism of FIG. 9 in a third position.
Figure 20:
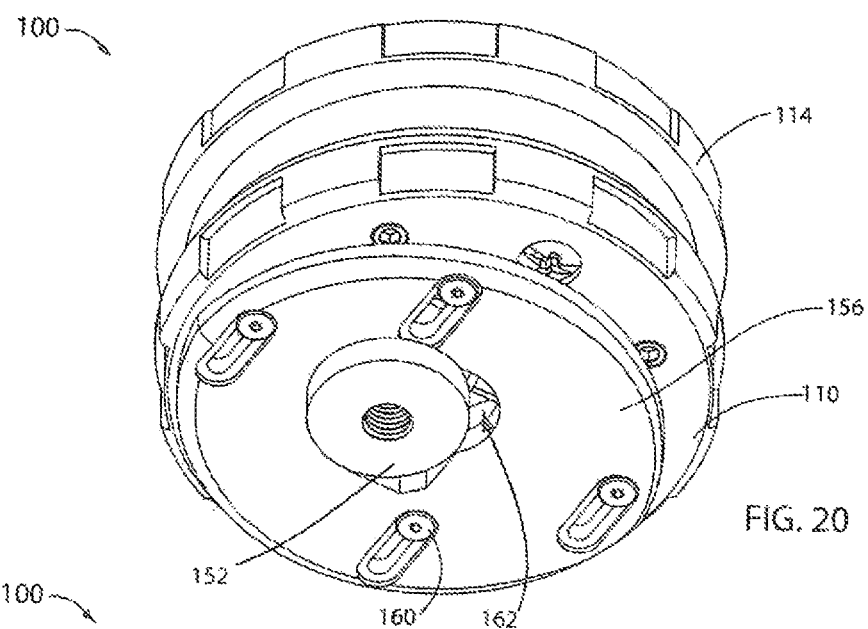
FIG. 20 is a bottom perspective view of the adjustable stroke mechanism of FIG. 9 in a fourth position.
Figure 21:
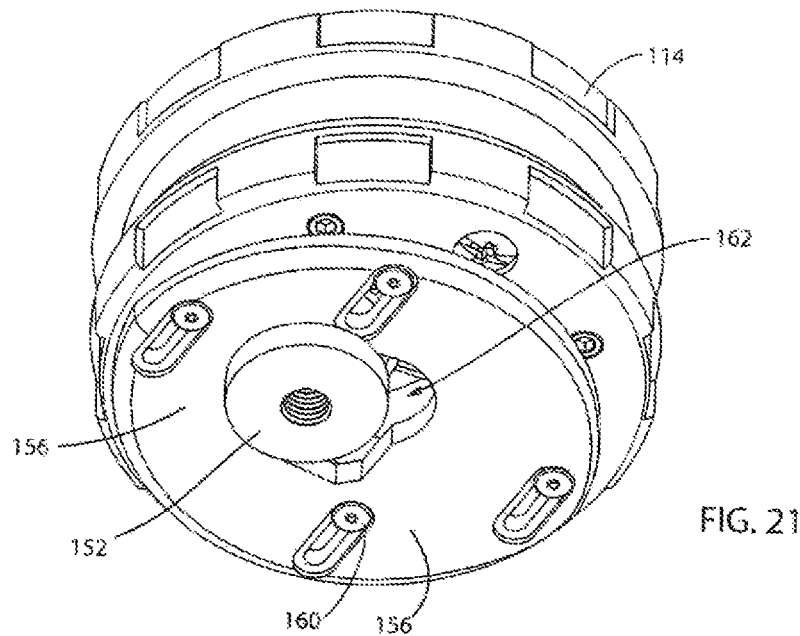
FIG. 21 is a bottom perspective view of the adjustable stroke mechanism of FIG. 9 in a fifth position.

FIG. 16 illustrates a bottom perspective view of the stroke mechanism 100 in the first position and also with the locking plate 156 in the locked position 191. As described above, the orifice 162 contains a notch 164, which, when in the located position, engages the backing plate mount 152 to prevent movement of the bearing axle 148 and the bearing carriage 136, and, as a result, prevents movement of the adjuster ring 114.

FIGS. 17-21 show a bottom perspective view of the stroke mechanism 100 in a number of predetermined locations with the locking plate 156 in the unlocked position 192. The combination of figures illustrates the movement of the bearing axle 148 as the adjuster ring 114 is rotated, resulting in a change in the stroke.

Figure 22:
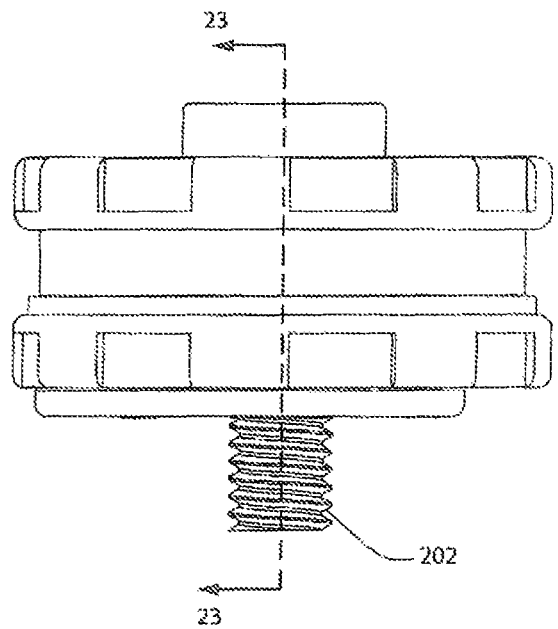
FIG. 22 is a side view of an adjustable stroke mechanism, according to an alternative embodiment of the invention.
Figure 23:
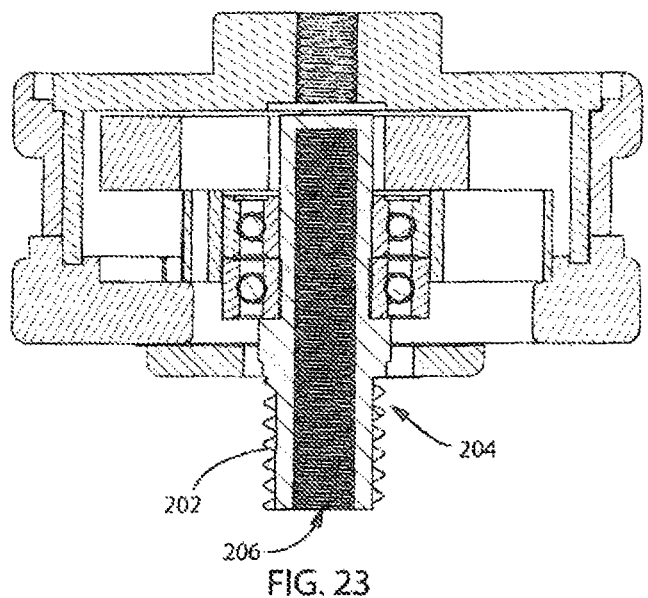
FIG. 23 is a cross-sectional view of a bearing axle of the adjustable stroke mechanism of FIG. 22 taken along line 23-23.

FIG. 22 illustrates a side view of a stroke mechanism 200, according to an alternative embodiment of the invention. In this embodiment of the invention, the backing plate mount 152 is replaced with a backing plate mount 202. A cross-sectional view of the backing plate mount 202 is shown in FIG. 23. As depicted in FIG. 23, the backing plate mount 202 includes an outer thread 204 and an inner thread 206. As such, the backing plate mount 202 is able to interfit with a variety of backing plate sizes.

Figure 24:
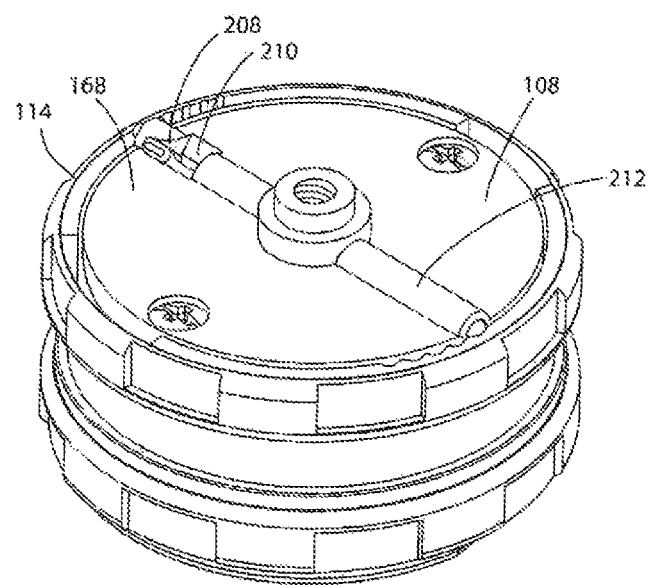
FIG. 24 is a top perspective view of an adjustable stroke mechanism, according to an alternative embodiment of the invention.

FIG. 24 illustrates a top perspective view of a stroke mechanism 208, according to an alternative embodiment of the invention. In this embodiment of the invention, the plurality of indentations 172 of the housing 102 is replaced with a locking pin 210. Additionally, the detent 174 of the adjuster ring is replaced with a plurality of indentations 212, similar to the plurality of indentations 172 shown in FIG. 3.

That is, the locking pin 210 is configured to interfit when a respective one of the plurality of indentations 212 when in a locked position. On the other hand, when the locking pin 210 is in an unlocked position, the adjuster ring 114 is able to be rotated. The locking pin 210 includes a spring 214 configured to maintain the locking pin 210 in the locked position unless the locking pin 210 is manually moved to and maintained in the unlocked position by a user.

In the representative embodiment of the invention, a covered channel 216 is formed in the outer surface 168 of the top plate 108 of the housing 102. The locking pin 210 and the spring 214 are housed within the covered channel 216. While FIG. 24 shows the covered channel 216 along the entire length of the outer surface 168 of the top plate 108, it is contemplated that the covered channel 216 may exists along any distance along the outer surface 168 of the top plate 108.

It is specifically intended that the present invention not be limited to the embodiments and illustrations contained herein, but includes modified forms of those embodiments including portions of the embodiments and combinations of elements of different embodiments as come within the scope of the following claims.

What is claimed is:

1. An adjustable stroke mechanism for providing a random orbital machine comprising:
    a housing having a central axis and a wall enclosing a cavity;
    at least one counterweight movably disposed within the housing;
    a mounting assembly disposed within the housing, the mounting assembly including a mechanism to attach to a workpiece;
    a stroke adjustor coupling the at least one counterweight with the mounting assembly, the stroke adjustor positioning the counterweight with respect to the mounting assembly such that the counterweight and mounting assembly move with respect to one another such that a lateral distance between the counterweight and the mounting assembly is variably adjusted which, in turn, variably adjusts a stroke radius of the mechanism to attach the workpiece with respect to the central axis of the housing.

2. The adjustable stroke mechanism of claim 1, further comprising at least one rotating part comprising a plurality of gears meshing with one another; and the stroke adjustor further comprising an adjustment bar, one of the plurality of gears coupled with the counterweight and another of the plurality gears coupled with the mounting assembly, the adjustment bar secured between the counterweight and mounting assembly so that the counterweight and mounting assembly move along the adjustment bar with respect to one another.

3. The adjustable stroke mechanism of claim 1, further comprising a pinion gear and the stroke adjustor further comprising a rack mechanism including a pair of arms, one arm including the counterweight and the other arm including the mounting assembly, the counterweight and mounting assembly move with respect to one another.

4. The adjustable stroke mechanism of claim 1, wherein:
    the stroke adjustor includes an adjuster ring surrounding the wall of the housing, the adjuster ring having a first set of gear teeth along a first portion of an inner surface of the adjuster ring and a second set of gear teeth along a second portion of the inner surface of the adjuster ring;
    the counterweight has an orifice and a set of gear teeth along an exterior surface;
    a first rotatable part disposed between the counterweight and the adjuster ring and meshing with the first set of gear teeth of the adjuster ring and the set of gear teeth of the counterweight so that rotation of the adjuster ring causes movement of the counterweight;
    the mounting assembly including a bearing carriage disposed within the housing, the bearing carriage has an orifice and a set of gear teeth along an exterior surface;
    a second rotatable part disposed between the bearing carriage and the adjuster ring within another of the plurality of apertures in the wall of the housing, the second rotatable part meshing with the second set of gear teeth of the adjuster ring and the set of gear teeth of the bearing carriage so that rotation of the adjuster ring causes movement of the bearing cage.

5. The adjustable stroke mechanism of claim 2, wherein the counterweight and mounting assembly include a pin securing them to a respective gear, the counterweight includes a key sliding in a slot in the adjustment bar and the pin for the mounting assembly slides in the slot of the adjustment bar.

6. The adjustable stroke mechanism of claim 3, further comprising a second pinon moving the pair of racks arms, the counterweight is on an end of one arm and the backing plate mounting assembly is on an end of the other arm, the counterweight and backing mounting plate assembly move toward and away from one another.

7. The adjustable stroke mechanism of claim 4, the mechanism for attaching the workpiece further comprising a bearing axle, the bearing axle extending through the housing, through the orifice of the bearing carriage, and through the orifice of the counterweight.

8. The adjustable stroke mechanism of claim 7, further comprising at least one bearing surrounding the bearing axle and disposed within the orifice of the bearing carriage.

9. A method of adjusting a stroke of a random orbital machine comprising:
    coupling an adjustable stroke mechanism to a random orbital machine, the adjustable stroke mechanism comprising:
    a housing having a central axis and a wall enclosing a cavity;
    at least one counterweight movably disposed within the housing;
    a mounting assembly disposed within the housing; the mounting assembly including a mechanism for attaching to a workpiece;
    a stroke adjustor coupling the at least one counterweight with the backing plate mount assembly, the stroke adjustor positioning the counterweight with respect to the mounting assembly such that the counterweight and mounting assembly move with respect to one another such that a distance between the counterweight and the mounting assembly is variably adjusted which, in turn, variably adjusts a stroke radius of the mounting assembly with respect to the central axis of the housing.

\* \* \* \* \*

UNITED STATES PATENT AND TRADEMARK OFFICE
CERTIFICATE OF CORRECTION

Page 1 of 1

PATENT NO.       : 10,981,258 B2
APPLICATION NO.  : 16/057002
DATED            : April 20, 2021
INVENTOR(S)      : Scott McLain et al.

It is certified that error appears in the above-identified patent and that said Letters Patent is hereby corrected as shown below:

In the Specification

Column 3
Line 27    after "includes", insert --a--
Line 55    "it" should be --in--

Column 11
Line 5     "is," should be --is--
Line 50    delete "both," and insert --both--

Signed and Sealed this
Seventh Day of December, 2021

Drew Hirshfeld
*Performing the Functions and Duties of the
Under Secretary of Commerce for Intellectual Property and
Director of the United States Patent and Trademark Office*